United States Patent [19]

Via

[11] 4,118,298

[45] Oct. 3, 1978

[54] PHOTOPOLYMERIZABLE ARYL AND HETEROCYCLIC GLYOXYLAMIDE COMPOSITIONS

[75] Inventor: Francis A. Via, Yorktown Heights, N.Y.

[73] Assignee: Stauffer Chemical Company, Westport, Conn.

[21] Appl. No.: 787,827

[22] Filed: Apr. 15, 1977

[51] Int. Cl.² ............................ C08F 2/46; C08F 4/00
[52] U.S. Cl. .................... 204/159.23; 96/115 P; 204/159.18; 204/159.24; 260/22 LB; 260/837 R
[58] Field of Search ............... 204/159.18, 159.23, 204/159.24; 96/115 P

[56] References Cited

U.S. PATENT DOCUMENTS

| | | | |
|---|---|---|---|
| 3,930,868 | 1/1976 | Muzyczko et al. | 96/115 P |
| 4,017,652 | 4/1977 | Gruber | 427/54 |
| 4,024,296 | 5/1977 | Gruber | 427/53 |
| 4,024,297 | 5/1977 | Gruber | 427/54 |
| 4,038,164 | 7/1977 | Via | 204/159.15 |

Primary Examiner—Richard B. Turer
Attorney, Agent, or Firm—William R. Robinson

[57] ABSTRACT

A photopolymerizable composition comprising photopolymerizable ethylenically unsaturated compounds and, as the photoinitiator, a glyoxylamide having the formula:

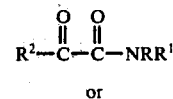

I or

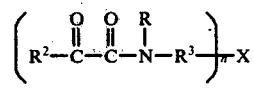

II wherein R and $R^1$ are individually selected hydrogen or hydrocarbon of from 1 to 10 carbon atoms; $R^2$ is a heterocyclic radical, aryl of from 6 to 14 carbon atoms or mono-, di- or polysubstituted phenyl with substituents selected from the group consisting of alkyl, alkoxy, aryloxy, alkylthio, arylthio and halogen; $R^3$ is phenyl or $-(CH_2)_z-$ where z is an integer from 2 to 6;

X is zero, oxygen, sulfur, —NH—, phosphorus or silicon; and n is an integer from 2 to 4. The composition cures upon exposure to actinic radiation.

30 Claims, No Drawings

PHOTOPOLYMERIZABLE ARYL AND HETEROCYCLIC GLYOXYLAMIDE COMPOSITIONS

CROSS-REFERENCE TO RELATED APPLICATION

Copending application, Ser. No. 614,469, filed Sept. 18, 1975.

BACKGROUND OF THE INVENTION

This invention relates to photopolymerizable compositions and to a method employing same. More particularly, this invention relates to the use of certain glyoxylamides as photoinitiators for ethylenically unsaturated compounds.

Photopolymerization of unsaturated compositions wherein a photoinitiating compound is included in the polymerizable mass is well known in the art. The process has many advantages over thermal polymerization and is particularly useful where long holding life combined with rapid hardening at low temperature is desirable. Photoinitiating compounds must absorb light and utilize the energy so acquired to initiate polymerization.

A large number of compounds have been found useful as photoinitiators for the polymerization of unsaturated compounds. Among those heretofore in most common usage in industry are the benzoin ethers of primary and secondary alcohols such as methyl alcohol, ethyl alcohol, isopropyl alcohol and isobutyl alcohol. Also, compounds such as phenyl glyoxal and 1-phenyl butane-1,2-dione are disclosed as photosensitizers in U.S. Pat. No. 2,413,973. Additionally, various acetophenone compounds such as 2,2-diethoxyacetophenone are claimed to have photoinitiating capability in U.S. Pat. No. 3,715,293.

While particular industrial applications often dictate certain requisite characteristics, the primary determinants of universal application in the selection of a suitable photoinitiating compound are its level of reactivity and its effect upon storage stability when combined with the photopolymerizable medium wherein it is to function. This latter characteristic is significant in view of the desirability of one-component systems which will not gel prior to use.

While compounds in common use as photoinitiators do effect rates of polymerization which are industrially acceptable and render photopolymerization superior to thermal polymerization in various applications, methods of achieving increased polymerization rates with increased stability are constantly being sought. Improved photoinitiators are particularly desirable since photopolymerization techniques are gaining increasingly widespread acceptance due to the inherently lower equipment costs, reduction of volatile emissions and reduced energy consumption which attend their use.

Thus, the ethers of benzoin, which are widely used as photoinitiating compounds, are not wholly satisfactory with regard to the one-component system storage stability factor. Any unsaturated system to which a benzoin ether is added has considerably diminished dark storage stability and will gel prematurely. Various attempts have been made to remedy this deficiency of the benzoin compounds by including stabilizing additives in the polymerization system. Thus, U.S. Pat. No. 3,819,495 discloses the addition of organic chlorine containing compounds and copper compounds as a stabilization system while U.S. Pat. No. 3,819,496 teaches the use of organic chlorine compounds with iron and/or manganese compounds for that purpose. Many other stabilizers have been suggested and, while some improvements have been achieved in the stability of unsaturated systems containing benzoin-type photoinitiators, the necessity of incorporating stabilizing additives raises the cost of such systems appreciably while the results are still not wholly satisfactory.

Another highly desirable characteristic of a photoinitiating composition is its capacity to function acceptably in polymerizable systems which contain various pigments. This attribute is significant commercially because inorganic pigments are one of the prime components of surface coating systems and contribute directly to the usefulness of such systems by virtue of their protective function, their decorative or artistic function and other miscellaneous functions. The white opaque pigments, characterized by titanium dioxide, are the most important single group of pigments in use because of the predominance of white as a color and because of the need to use white pigments in producing many tints and light hues of color.

With regard to rate of polymerization, the resultant surface texture of the polymerized, pigmented coating and the effect of the photoinitiating compound on the color itself, none of the most widely used photoinitiating compounds is wholly acceptable in titanium dioxide pigmented unsaturated systems.

Now it has been found in accordance with this invention that certain glyoxylamides are excellent photoinitiators for ethylenically unsaturated compounds. These photoinitiators provide polymerizable systems not subject to premature gelation. Furthermore, these photoinitiators are reactive in many different systems based on ethylenically unsaturated compounds.

SUMMARY OF THE INVENTION

The photopolymerizable composition of this invention comprises an ethylenically unsaturated compound and a glyoxylamide. After applying the compositions to the desired substrate, curing is effected by exposure to actinic radiation.

DETAILED DESCRIPTION OF THE INVENTION

More in detail, the photopolymerizable composition of this invention comprises an ethylenically unsaturated monomer and, as the photoinitiator, a glyoxylamide having the formula:

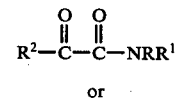

or

wherein R and $R^1$ are individually selected hydrogen or hydrocarbon of from 1 to 10 carbon atoms; $R^2$ is a heterocyclic radical, aryl of from 6 to 14 carbon atoms or mono-, di- or polysubstituted phenyl with substituents selected from the group consisting of alkyl, alkoxy, aryloxy, alkylthio, and halogen; $R^3$ is phenyl or $-CH_2)_z$ where z is an integer from 2 to 6; X is zero, oxygen, sulfur, —NH—, phosphorus or silicon; and n is an integer from 1 to 4. The composition cures upon exposure to actinic radiation.

In the foregoing definitions the term "hydrocarbon of from 1 to 10 carbon atoms" refers to straight and branched chain acyclic hydrocarbon groups which may contain unsaturated carbon-to-carbon bonds, phenyl and aralkyl, the latter term referring to a phenyl group containing a straight chain saturated hydrocarbon substituent of from 1 to 3 carbon atoms and being bonded to the amido nitrogen thereby. The term "aryl of from 6 to 14 carbon atoms" refer to mono- or polycyclic aromatic substituents such as phenyl, biphenyl, naphthyl, anthracyl, tolyl, xylyl, methoxyphenyl, nitrophenyl, etc. Regarding the phenyl substituents, all alkyl groups, whether directly bonded to the aromatic group or bonded thereto by oxygen or sulfur are straight or branched chain hydrocarbons of 1 to 5 carbon atoms. The term "aryl" in "aryloxy" and "arylthio" refers to phenyl. The term "heterocyclic radical" indicates a five to six membered cyclic nucleus which may contain up to 2 atoms of oxygen, nitrogen or sulfur, or combinations thereof, in addition to carbon. The halogen atoms can be any of the four halogens, fluorine, chlorine, bromine or iodine.

Illustrative compounds include, but are not limited to benzoylformamide (also known as phenylglyoxylamide), N-methyl benzoylformamide, N-ethyl benzoylformamide, N-i-butyl benzoylformamide, N-octyl benzoylformamide, N-decyl benzoylformamide, N,N-dimethyl benzoylformamide, 4-pyridylglyoxylamide, 2-thiophene glyoxylamide, N,N-dihexyl benzoylformamide, N-ethyl naphthoylformamide, N-i-propylnaphthoylformamide, naphthoylformamide, N-butyl-$\beta$-naphthoylformamide, 1-anthroylformamide, N-2-ethyl-hexyl 2-anthroylformamide, 9-anthroylformamide, p-t-butylbenzoylformamide, m-chlorobenzoylformamide, N-heptyl-o-methoxylbenzoylformamide, N-ethyl-o-phenylbenzoylformamide, N,N' ethylene-bis-benzoylformamide, N,N'-(1,4 butylene) - bis-benzoylformamide, N,N' ethylenetriamine-bis-benzoylformamide, N,N',N'' ethylenetetramine-tris-benzoylformamide, N,N'-(2,2'-diaminoethyl ether) -bis-benzoylformamide, and N,N'-2,2'-di(aminoethyl)thioether - bis-benzoylformamide.

The glyoxylamides I are known compounds, some of which are commercially available. Alternately, they are readily prepared by methods described in the literature. Thus, for example, they can be prepared by the amidation techniques described in U.S. Pat. Nos. 3,532,737 and 3,657,325.

The compositions curable by actinic radiation according to the invention can contain a photopolymerizable polymer in a reactive ethylenically unsaturated monomeric medium, a reactive polymer alone, a reactive monomer alone, or any of these combined with an inert solvent. Additionally, the polymerizable composition can contain any of the pigments commonly used in photopolymerization techniques.

Polymerizable ethylenically unsaturated compounds which are useful in practicing the invention are acrylic, α-alkacrylic and α-chloroacrylic acid compounds such as esters, amides and nitriles. Examples of such compounds are acrylonitrile, methacrylonitrile, methyl acrylate, ethyl acrylate, methyl methacrylate, isobutyl methacrylate, 2- ethylhexyl acrylate, methacrylamide and methyl α-chloroacrylate. Also useful, although not preferred due to their slower rates of reactivity, are vinyl and vinylidene esters, ethers and ketones. Additionally, compounds having more than one terminal unsaturation can be used. Examples of these include diallyl phthalate, diallyl maleate, diallyl fumarate, triallyl cyanurate, triallyl phosphate, ethylene glycol dimethacrylate, glycerol trimethacrylate, pentaerythritol triacrylate, pentaerythritol tetraacrylate, trimethylolpropane triacrylate, methacrylic anhydride and allyl ethers of monohydroxy or polyhydroxy compounds such as ethylene glycol diallyl ether, pentaerythritol tetraallyl ether, and the like. Nonterminally unsaturated compounds such as diethyl fumarate can similarly be used.

The acrylic acid derivitives are particularly well suited to the practice of the invention and are consequently preferred components as monomers in monomer-containing polymerizable systems and as reactive centers in polymerizable polymers. While monomeric styrene can be used in the practice of the invention, it is not a preferred constituent of systems polymerizable thereby due to its slow rate of reaction.

Additionally, the photopolymerizable composition can contain a sensitizer capable of enhancing the photoinitiating reactivity of the photoinitiating compound of the invention by triplet sensitization. Examples of sensitizers useful in the practice of the invention are such compounds as biphenyl, xanthone, thioxanthone, acetophenone and the like. These are typically added in amounts ranging from about 0.1 to about 6 weight percent. The techniques whereby such sensitizers are selected for use in conjunction with particular photoinitiators are well known in the art. See, for example, MUROV, Handbook of Photochemistry, Marcel Dekker, Inc., New York (1973).

Additionally polymerization promoters such as organic amines can be used to accelerate cure rates, either alone or in combination with a sensitizer. Such amines can be primary, secondary, or preferably, tertiary, and can be represented by the general formula:

wherein R' and R" are independently selected hydrogen, straight chain or branched alkyl having from 1 to about 12 carbon atoms, straight chain or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R" with the exception that it cannot be hydrogen and that it cannot be aryl when both R' and R" are aryl. Also, when taken together R" and R''' can be a divalent alkylene group having from 2 to about 12 carbon atoms, a divalent alkenylene group having from 3 to about 10 carbon atoms, a divalent alkadienylene group having from 5 to about 10 carbon atoms, a divalent alkatrienylene group having from 5 to about 10 carbon atoms, a divalent alkyleneoxyalkylene group having a total of from 4 to about 12 carbon atoms, or a divalent alkyleneaminoalkylene group having a total of from 4 to about 12 carbon atoms. As previously indicated, the amines can be substituted with other groups; thus, the R',R" and R''' variables, whether taken singly or together, can contain one or more substituents thereon. The nature of such substituents is generally not of significant importance and any substituent group can be present that does not exert a pronounced deterrent effect on the ultraviolet crosslinking reaction.

Exemplary suitable organic amines are methylamine, dimethylamine, triethylamine, isopropylamine, triisopropylamine, tributylamine, t-butylamine, 2-methylbutylamine, N-methyl-N-butylamine, di-2-methylbutylamine, tri-2-ethylhexylamine, dodecylamine, tri-2-chloroethylamine, di-2-bromoethylamine, methanolamine, triethanolamine, methyldiethanolamine, propanolamine, triisopropanolamine, butylethanolamine, dihexanolamine, 2-methoxyethylamine, 2-hydroxyethyldiisopropylamine, allylamine, cyclohexylamine, trimethylcyclohexylamine, bis-methylcyclopentylamine, tricyclohexadienylamine, N-methyl-N-cyclohexylamine, N-2-ethylhexyl-N-cyclohexylamine, diphenylamine, methylphenylamine, trixylyl-amine, tribenzylamine, triphenethylamine, benzyldimethyl, N-methylethylenimine, N-cyclohexylethylenimine, piperidine, N-ethylpiperidine, 1,2,3,4-tetrahydropyridine, 2-, 3- and 4-picoline, morpholine, N-methyl morpholine, N-2-hydroxyethylmorpholine, piperazine, N,N''-dimethylpiperazine, 2,2-dimethyl-1, 3-bis [3 (N-morpholinyl-propionyloxy]-propane, and the like. The preferred organic amines are the tertiary amines, with the alkanol amines being most preferred.

Thus it is seen that the constitution of photopolymerizable compositions which can be used in the practice of the invention is widely variable. However, the compounds enumerated above are purely illustrative. Materials subject to polymerization by actinic radiation as well as permissable variations and substitutions of equivalent components within particular types of compositions are well known to those skilled in the art.

The photoinitiators of the invention can be utilized in amounts ranging from 0.01 to about 30 percent by weight based on the photopolymerizable composition. However, preferable amounts of the compounds are between 0.5 and 20 weight percent with optimal results being achieved with amounts in the range of 1.0 to about 16 weight percent.

The process can be carried out by mixing a quantity of a photoinitiating compound of the invention with a photopolymerizable composition and exposing the resultant mixture to actinic radiation. Alternatively, a one-component system comprising the photopolymerizable composition, the photoinitiator of the invention and, if desired, pigmentation, can be stored in the dark for a prolonged period of time prior to use without fear of gelation.

A preferred manner of practicing the invention is by the use of photopolymerizable molding and coating compositions which consist of mixtures of unsaturated polymeric compounds and monomeric compounds copolymerizable therewith. The polymeric compounds can be conventional polyesters prepared from unsaturated polycarboxylic acids such as maleic acid, fumaric acid, glutaconic acid, itaconic acid, citraconic acid, mesaconic acid and the like, and polyhydric alcohols such as ethylene glycol, diethylene glycol, glycerol, propylene glycol, 1,2-butanediol, 1,4-butanediol, pentaerythritol, trimethylolpropane and the like. The carboxylic acid content can also contain saturated components. The inclusion of a monobasic fatty acid content, either as such or in the form of a triglyceride or oil, in the photopolymerizable polyester composition to comprise an alkyd resin is also acceptable. These resins can, in turn, be modified by silicones, epoxides, isocyanates, etc., by known techniques.

The compositions of the instant invention after being prepared in the ratios as set out above can be applied to the material to be coated by conventional means, including brushing, spraying, dipping and roll coating techniques, and may, if desired, be dried under ambient or elevated conditions to provide coatings on the substrate. The substrate can be of any composition, including but not limited to plastic, fiber, ceramic, glass, etc.

After the composition is applied to the desired substrate, it is exposed to light radiation having wave lengths of above about 2000 Angstrom units preferably from about 2000 up to about 8000 Angstroms, and most preferably between about 2400 Angstroms and 5400 Angstroms. Exposure should be from a source located about 1 to 5 inches from the coating for a time sufficient to cause crosslinking of the composition.

The light radiation can be ultraviolet light generated from low, medium, and high pressure mercury lamps. This equipment is readily available and its use is well known to those skilled in the art. Other sources could include electron beam radiation, plasma arc, laser beams, etc.

While any of the glyoxlyamides having the formula I can be used in the practice of this invention, preferred are those compounds I wherein R and $R^1$ are individually selected hydrogen, alkyl of 1 to 4 carbon atoms or phenyl; $R^2$ is phenyl or substituted phenyl; $R^3$ is alkylene of 1 to 4 carbon atoms; X is zero or —NH— and $n$ is 2. Most preferred are compounds within the foregoing definition having the general formula I.

In the following examples, which will serve to illustrate the practice of this invention, all parts and percentages are by weight unless otherwise specified.

EXAMPLE I

To a standard test solution consisting of 42% by weight of trimethylolpropane triacrylate, 17% by weight of ethylhexyl acrylate and 41% by weight of ACTOMER - 80 ® Resin, an unsaturated long chain linseed oil alkyd resin, available from Union Carbide Corporation, was added 4.0% by weight of N,N - diethyl phenylglyoxylamide.

Cure rates were determined using as a source of actinic light a PPG Model QC 1202 AN UV Processor manufactured by PPG Industries, Inc. The radiation source for this apparatus consists of two high intensity medium pressure quartz mercury lamps 12 inches in length and each operating at a linear power density of about 200 watts per inch or 2400 watts per lamp. The lamps are housed in an elliptical reflector above a variable speed conveyor belt and each lamp provides a 2-inch band of high flux actinic radiation on the conveyor. This 2-inch exposure area is bordered on both sides by an additional 2-inch area of medium flux energy for a total radiation area of 6 inches for each lamp. In the curing data presented below, cure rate of the polymerizable composition is presented in feet-per-minute-per-lamp (ft./min./lamp). Thus, a conveyor belt speed of one foot/min. will, with a 12-inch exposure area for the two lamps, provide 60 seconds of exposure or a cure rate of 0.5 ft./min./lamp. Similarly, a belt speed of 10ft./min. will provide 6 seconds of exposure or a rate of 5.0 ft./min./lamp while a speed of 20.0 ft./min. will give 3 seconds exposure or a rate of 10 ft./min./lamp, etc.

The composition had a cure rate of 5ft./min./lamp in air and 40 ft./min./lamp in nitrogen.

EXAMPLE 2

This example illustrates the effect of concentration of phenylglyoxylamide on the rate of polymerization of the standard test solution described in Example 1.

| Sample | Concentration of Phenyl Glyoxylamide (Wt%) | Cure Rate (Ft./min.lamp) Air | Cure Rate (Ft./min.lamp) Nitrogen |
|---|---|---|---|
| 1 | 1.0 | 4 | 25 |
| 2 | 2.0 | 10 | 35 |
| 3 | 4.0 | 18 | 35 |
| 4 | 8.0 | 30 | 30 |
| 5 | 12.0 | 45 | 25 |

EXAMPLE 3

Varying concentrations of N-n-butyl phenylglyoxylamide were added to samples of the standard test solution described in Example 1; the cure data is presented below.

| Sample | Concentration of N-n-Butyl Phenylglyoxylamide (Wt%) | Cure Rate (Ft./min./lamp) Air | Cure Rate (Ft./min./lamp) Nitrogen |
|---|---|---|---|
| 1 | 1.0 | 3 | 15 |
| 2 | 2.0 | 5 | 15 |
| 3 | 4.0 | 13 | 15 |
| 4 | 8.0 | 17 | 10 |
| 5 | 16.0 | 15 | 10 |

EXAMPLE 4

This example illustrates the effect of including an amine as a promoter with the glyoxylamides of the preceding examples. The standard test solution of Example 1 was employed and the glyoxylamides were added at a level of 4% by weight of the standard test solution.

| Glyoxylamide | Concentration of $(CH_3)_2NCH_2CH_2OH$ (Wt % of Standard Test Solution) | Cure Rate (ft./min./lamp Air) |
|---|---|---|
| Phenylglyoxylamide | 0 | 15 |
|  | 4.0 | 25 |
| N-n-butyl phenyl-glyoxylamide | 0 | 13 |
|  | 4.0 | 16 |
| N,N-diethyl phenyl-glyoxylamide | 0 | 3 |
|  | 4.0 | 4 |

EXAMPLE 5

This example indicates the cure rates for a glyoxylamide of this invention employed alone and with an amine promoter in different resin systems; the initiator loading was 4% by weight of the resin for both the phenylglyoxylamide and the amine.

| Resin (50% by weight of each component) | Cure Rate in Air (Ft./min./lamp) Phenylglyoxylamide | Phenylglyoxylamide and $(CH_3)_2NCH_2CH_2OH$ |
|---|---|---|
| TMPTA[1]/UVIMER-540[2] | 20 | 50 |
| TMPTA[1]/EPOCRYL® Resin DRH-303[3] | 45 | 50 |
| TMPTA[1]/ACTOMER X-80®[4] | 25 | 32 |
| HDODA[5]/ACTOMER X-80®[4] | 30 | 27 |
| PEA[6] | 25 | 60 |
| PS[7] | 0 | — |
| SUNCURE[8] | 27 | 65 |

[1]Trimethylol propane triacrylate
[2]Resin composed of 49 parts urethane oligomer B, 19 parts hydroxyethyl acrylate and 32 parts pentaerythritol tetraacrylate, avialable from Polychrome Corporation.
[3]A diacrylate ester of Bisphenol A Epoxy Resin, available from Shell Chemical Company.
[4]An unsaturated long chain linseed oil alkyl resin available from Union Carbide Corporation.
[5]1,6-Hexanediol diacrylate available from Celenese Corporaton.
[6]Pentaerythritol acrylate available from Satomer Company.
[7]Polystyrene resin, available from PPG Industries.
[8]An isocynate-acrylate resin available from Sun Chemical Company.

EXAMPLE 6

Various bi-functional glyoxylamides were prepared by reacting two moles of methyl phenylglyoxalate with one mole of the appropriate amine. The resulting compounds were added at 4% by weight loading, to samples of the standard test solution described in Example 1; the cure rates are presented below.

| Glyoxylamide | CURE RATE IN AIR (Ft./min./lamp) |
|---|---|
| $\left(C_6H_5-\overset{O}{\underset{\|}{C}}-\overset{O}{\underset{\|}{C}}-NHCH_2CH_2CH_2\right)_2$ | 8 |
| $\left(C_6H_5-\overset{O}{\underset{\|}{C}}-\overset{O}{\underset{\|}{C}}-NHCH_2\right)_2$ | 2 |
| $\left(C_6H_5-\overset{O}{\underset{\|}{C}}-\overset{O}{\underset{\|}{C}}-NHCH_2CH_2\right)_2NH$ | 3 |

EXAMPLE 7

In order to demonstrate the dark-storage stability of the glyoxylamide of this invention, 4% by weight of phenylglyoxylamide was added to Satomer SR 351 resin, a trimethylolpropane triacrylate available from Satomer Company. Another sample was prepared employing 4% by weight of benzoin isobutyl ether as the initiator instead of the glyoxylamide. Glass jars were filled to greater than 90% by volume with the stabilized compositions, which were then stored in the dark at 65° C. Stability is reported below as the number of days the compositions remained stable prior to gelation.

| Initiator | Stability (Days at 65° C.) |
|---|---|
| Benzoin isobutyl ether | 4 |
| Phenylglyoxylamide | 20+ |

What is claimed is:

1. A photopolymerizable composition comprising an ethylenically unsaturated compound and a photoinitiating amount of a glyoxylamide of the formula:

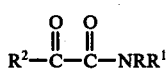   I or

   II wherein R and R¹ are individually selected hydrogen or hydrocarbon of from 1 to 10 carbon atoms; R² is a heterocyclic radical, aryl of from 6 to 14 carbon atoms or mono-, di- or polysubstituted phenyl with substituents selected from the group consisting of alkyl, alkoxy, aryloxy, alkylthio, arylthio and halogen; R³ is phenyl or $-(CH_2)_z$ where z is an integer from 2 to 6; X is zero, oxygen, sulfur, —NH—, phosphorus or silicon; and n is an integer from 1 to 4.

2. The composition of claim 1 where said glyoxylamide comprises between about 0.01 to about 30 percent by weight of said composition.

3. The composition of claim 2 wherein R and R¹ are individually selected hydrogen, alkyl of 1 to 4 carbon atoms or phenyl; R² is phenyl or substituted phenyl; R³ is alkylene of 1 to 4 carbon atoms; X is zero or —NH— and n is 2.

4. The composition of claim 3 wherein said glyoxylamide has the formula

5. The composition of claim 4 wherein said glyoxylamide is phenylglyoxylamide.

6. The composition of claim 4 wherein said glyoxylamide is N,N-diethyl phenylglyoxylamide.

7. The composition of claim 4 wherein said glyoxylamide N-n-butyl phenylglyoxylamide.

8. The composition of claim 4 further comprising a sensitizer or a promoter.

9. The composition of claim 8 wherein said promoter is an organic amine.

10. The composition of claim 3 wherein said glyoxylamide has the formula:

11. The composition of claim 10 wherein said glyoxylamide has the formula

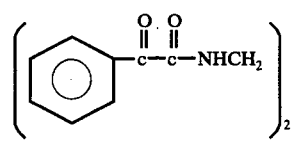

12. The composition of claim 10 wherein said glyoxylamide has the formula

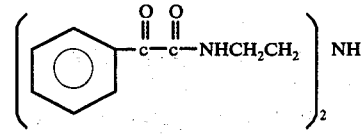

13. The composition of claim 10 wherein said glyoxylamide has the formula

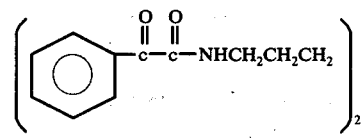

14. The composition of claim 10 further including a sensitizer or a promoter.

15. The composition of claim 14 wherein said promoter is an organic amine.

16. In the method of photopolymerizing an ethylenically unsaturated compound in the presence of a photoinitiator by exposure to actinic radiation, the improvement which comprises employing as said photoinitiator a glyoxylamide of the formula

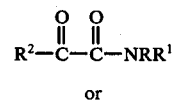   I or

   II wherein R and R¹ are individually selected hydrogen or hydrocarbon of from 1 to 10 carbon atoms; R² is a heterocyclic radical, aryl of from 6 to 14 carbon atoms or mono-, di- or polysubstituted phenyl with substituents selected from the group consisting of alkyl, alkoxy, aryloxy, alkylthio, arylthio and halogen; R³ is phenyl or $-(CH_2)_z$ where z is an integer from 2 to 6; X is zero, oxygen, suflur, —NH—, phosphorus or silicon; and n is an integer from 1 to 4.

17. The method of claim 16 wherein said glyoxylamide comprises between about 0.01 to about 30 percent by weight of said composition.

18. The method of claim 17 wherein R and R¹ are individually selected hydrogen, alkyl of 1 to 4 carbon atoms or phenyl; R² is phenyl or substituted phenyl; R³ is alkylene of 1 to 4 carbon atoms; X is zero or —NH— and n is 2.

19. The method of claim 18 wherein said glyoxylamide has the formula

20. The method of claim 18 wherein said glyoxylamide is phenylglyoxylamide.

21. The method of claim 18 wherein said glyoxylamide is N,N-diethyl phenylglyoxylamide.

22. The method of claim 18 wherein said glyoxylamide is N-n-butyl phenylglyoxylamide.

23. The method of claim 19 further comprising a sensitizer or a promoter.

24. The method of claim 23 wherein said promoter is an organic amine.

25. The method of claim 18 wherein said glyoxylamide has the formula

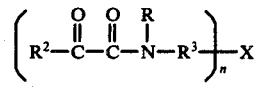

26. The method of claim 25 wherein said glyoxylamide has the formula

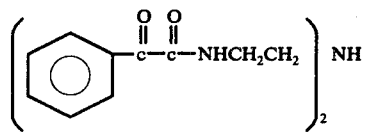

27. The method of claim 25 wherein said glyoxylamide has the formula:

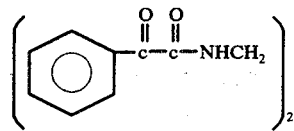

28. The method of claim 25 wherein said glyoxylamide has the formula

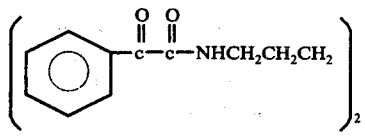

29. The method of claim 25 further including a promoter.

30. The method of claim 29 wherein said promoter is an organic amine.